United States Patent [19]

Ohmi et al.

[11] 4,368,661
[45] Jan. 18, 1983

[54] CONTROL VALVE FOR BRAKE BOOSTER

[75] Inventors: Atsushi Ohmi, Anjo; Chiaki Ochiai, Chiryu, both of Japan

[73] Assignee: Aisin Seiki Kabushiki Kaisha, Japan

[21] Appl. No.: 188,143

[22] Filed: Sep. 17, 1980

[30] Foreign Application Priority Data

Sep. 29, 1979 [JP] Japan ................................ 54-125921

[51] Int. Cl.³ ............................................. F15B 13/16
[52] U.S. Cl. .................................. 91/376 R; 137/627.5
[58] Field of Search ............. 91/369 A, 369 B, 369 R, 91/376 R; 92/49, 48; 137/627.5

[56] References Cited

U.S. PATENT DOCUMENTS 3,083,698 4/1963 Price et al. ...................... 91/376 R
4,283,911 8/1981 Nakamura et al. ............... 91/369 A Primary Examiner—Paul E. Maslousky
Attorney, Agent, or Firm—Finnegan, Henderson, Farabow, Garrett & Dunner

[57] ABSTRACT

Axially extending guide arms cooperate with the interior surfaces of an annular poppet member in the control valve of a brake booster for centering a resilient poppet member face against a succession of valve seats. The guide arms can be a tube contacting the inner annular poppet surfaces and slidingly engaging the inner periphery of the annular retainer that secures the poppet member to the valve housing. The tube can also be fixed to a plate backing the sealing face. Or, the guide arm can be a tubular extension of the retainer for slidingly engaging the poppet inner annular surfaces.

7 Claims, 3 Drawing Figures

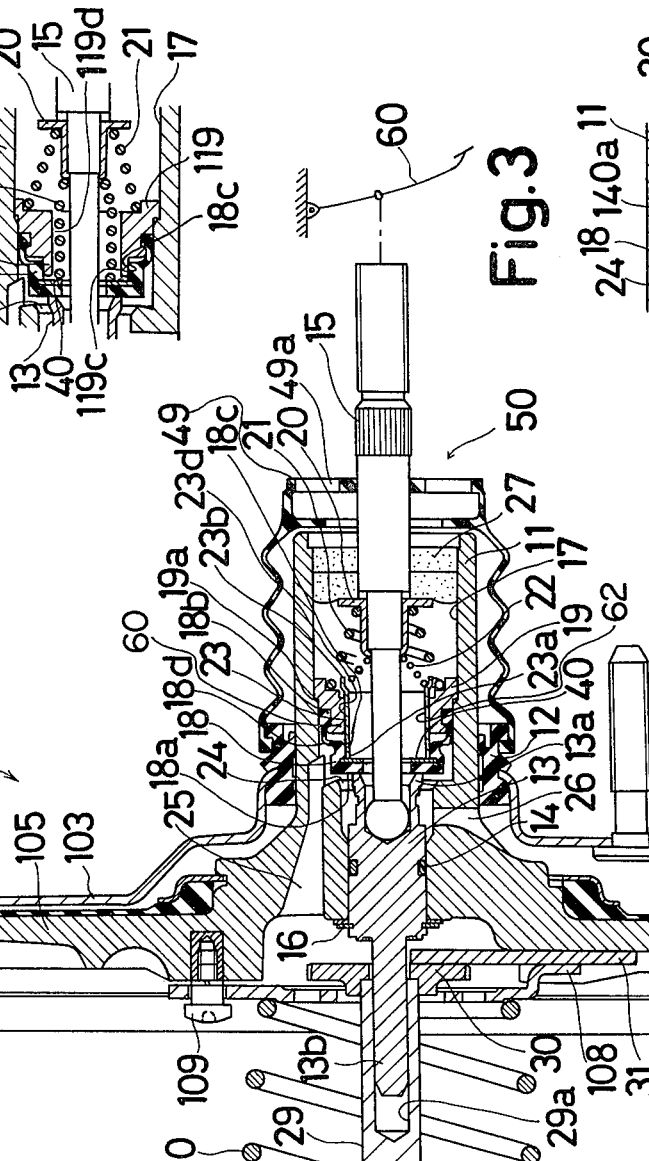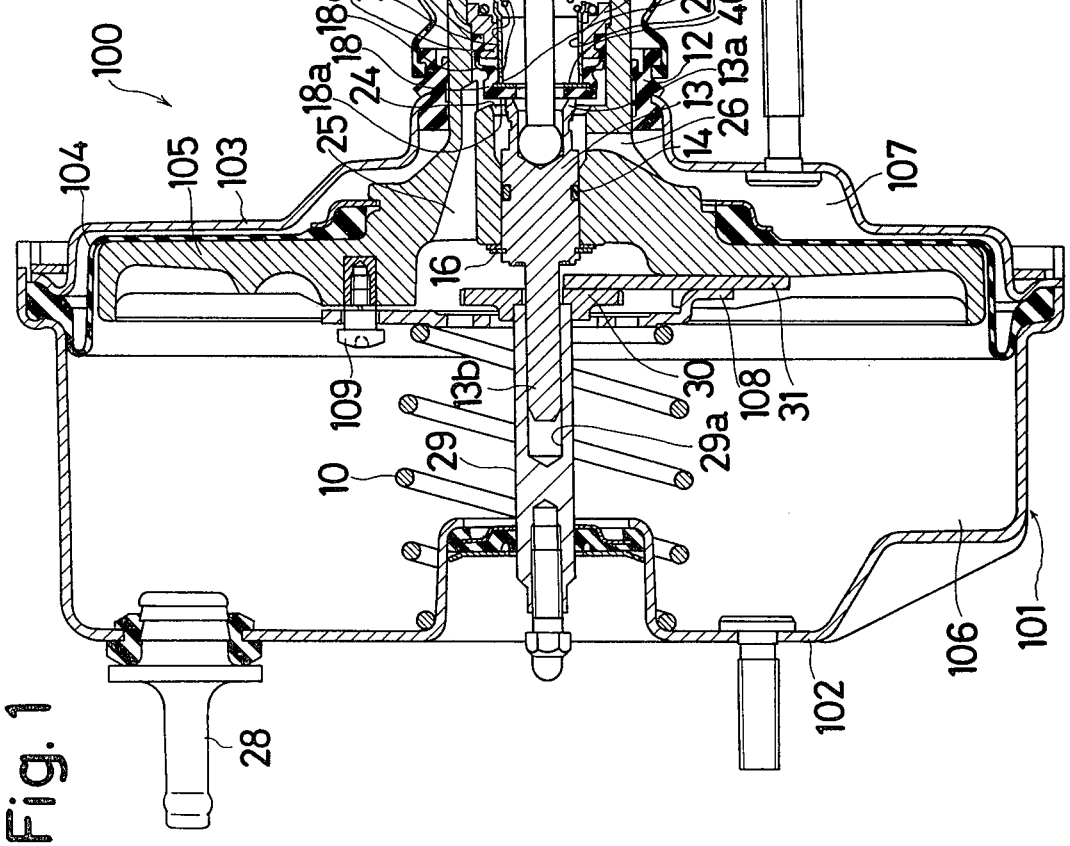

CONTROL VALVE FOR BRAKE BOOSTER

BACKGROUND OF THE INVENTION

1. Field of the Invention

The present invention relates generally to a brake booster for an automotive vehicle and more particularly to a control valve for controlling the pressure difference between opposite sides of a power piston in the brake booster in response to brake pedal depressing force.

2. Description of the Prior Art

In conventional brake booster control valves, an example of which is disclosed in U.S. Pat. No. 3,688,647, a poppet member made of resilient material such as rubber is biased forward by a coil spring interposed between the poppet member and a push rod the rear end of which is pivotally connected to a brake pedal. A front end of the push rod is pivotally connected to a plunger member which includes an annular valve seat on a rear end thereof for sealing abutment with the poppet member.

The valve seat of the plunger member of such conventional control valves is normally biased into sealing abutment with the poppet member under non-braking conditions. This can result in the formation of a permanent annular depression in the poppet member in the shape of the sealing surface of the annular valve seat and can require proper radial orientation of the poppet member to effect an adequate seal.

Because the push rod can become slanted during the operation of the brake booster as a result of the mechanical linkage with the foot pedal, as is well known, the coil spring can exert a radial force on the poppet member, causing radial movement of the poppet member relative to the valve seat. This condition can cause the annular valve seat to contact the poppet valve eccentrically to the permanent depression, and can thereby lead to sealing failure between the poppet member and the valve seat of the plunger.

SUMMARY OF THE INVENTION

It is one object of the present invention to provide an improved brake booster control valve of the kind having a poppet member with a sealing face made from a resilient material.

Another object of the present invention is to provide a control valve wherein unwanted radial movement of the poppet member is prevented.

A further object of the present invention is to provide a simple construction for preventing radial movement of the poppet member of otherwise conventional brake booster control valves.

To achieve the foregoing objects and in accordance with the purpose of the invention, as embodied and broadly described herein, the control valve of this invention for controlling the pressure difference between opposite sides of a power piston in a brake booster comprises a plunger member disposed within a central bore provided in the power piston; a push rod disposed within the bore rod being connected at one axial end to the plunger member and pivotally connected at the other axial end to a brake pedal; an annular poppet member having a sealing face made of resilient material at one axial end thereof, the poppet member being disposed within the bore, and the sealing face facing a first valve seat formed on one axial end of the plunger member and a second valve seat formed on the wall of the bore, the other axial end of the poppet member being sealingly secured to the wall of the bore, the poppet member having an intermediate flexible diaphragm portion; a coil spring for biasing the sealing face of poppet member toward the valve seats, one end of the coil spring being secured to the push rod; and guide means cooperating with the interior of the annular poppet member for centering the poppet member in the bore.

Preferably, the guide means includes an annular retainer positioned within the bore for securing the other axial end of the poppet member to the wall of the bore, and a tubular guiding member positioned within the poppet member, the outer cylindrical surface of the tubular member contacting the inner annular surface of the poppet member, the tubular guiding member being supported for centered, sliding axial movement by the retainer.

It is further preferred that a backing plate is secured within the poppet member proximate the one axial end, wherein said guiding member abuts the plate at one member end, the coil spring abutting the guiding member at the other member end.

Also, in accordance with the present invention, the tubular guiding member can be replaced with an axially extending guide arm integral with either the retainer or the backing plate, wherein the coil spring abuts directly against the backing plate.

The accompanying drawing, which is incorporated in and constitutes a part of this specification, illustrates several embodiments of the invention and, together with the description, serves to explain the principles of the invention.

BRIEF DESCRIPTION OF THE DRAWINGS

FIG. 1 is a sectional view of a brake booster with a first embodiment of a brake booster control valve according to the present invention.

FIG. 2 is a sectional view of a second embodiment of a control valve made in accordance with the present invention.

FIG. 3 is a view similar to FIG. 2 but showing a third embodiment of a control valve made in accordance with the present invention.

DETAILED DESCRIPTION OF THE PREFERRED EMBODIMENTS

Reference will now be made to the present preferred embodiments, examples of which are illustrated in the drawing.

Referring to FIG. 1, there is shown a brake booster incorporating a first embodiment of a control valve according to the present invention. The brake booster 100 comprises a housing 101 including front and rear members 102 and 103. An annular diaphragm 104 in the housing 101 is sealingly secured at outer and inner peripheral portions thereof to the housing 101 and to a power piston 105 in the housing 101 respectively. An interior space of the housing 101 is divided into front and rear chambers 106 and 107 by the diaphragm 104 and power piston 105. The front chamber 106 is normally supplied with vacuum pressure from a vacuum source, not shown, through a check valve 28.

Mounted on a front side of the power piston 105 by a suitable number of screws 109 is a spring retainer 108 axially movable against the power piston 105 in a predetermined stroke. Disposed between the front member 102 of the housing 101 and spring retainer 108 is a coil spring 10 to maintain the power piston 105 in normal position shown in FIG. 1 in normal condition.

The power piston 105 is formed on a rear side thereof with a cylindrical extension 11 sealingly and slidably passing through an opening formed in the rear member 103. A sealing member 12 is secured to the rear member 103 for sealing between the rear member 103 and extension 11 of the power piston 105. Extension 11 of the power piston 5 is formed with a stepped cylindrical bore 17 with a control valve 50 disposed therein for controlling the pressure difference between the front and rear chambers 106 and 107 in response to brake pedal depressing force.

In accordance with the present invention, and as embodied herein, the control valve 50 comprises a plunger member 13 provided on the outer periphery thereof with a sealing ring 14 and sealingly and slidably inserted into a front end portion of the bore 17. The plunger member 13 is connected to a front end of a push rod 15 which is pivotally connected at rear end thereof to a brake pedal 60 by a clevis, not shown, as is well-known. A ring 16 is secured to the plunger member 13 to limit the rearwardly travel of the plunger member 13 relative to the power piston 105. The plunger 13 has a rearwardly facing annular valve seat 13a on the rear face for sealing abutment with a flexible annular rubber poppet member 18.

As embodied herein, the poppet member 18 has a sealing face 18a, an intermediate flexible diaphragm portion 18d, and rear end 18b which is sealingly attached to an annular retainer 19 and is in sealing contact with the wall of the bore 17. The retainer 19 has a stepped portion 19a on an outer periphery thereof which is in contact with a stepped portion of the wall of the bore 17 to limit the forward movement of the retainer 19 relative to the power piston 105. A coil spring 21 interposed between the retainer 19 and a spring retainer 20 attached to the push rod 15 biases the retainer 19 to limit the rearward movement of the retainer 19 relative to the power piston 105. The spring 21 also biases the push rod 15 rearwardly.

In accordance with the present invention, guide means are provided for centering the poppet member 18 within bore 17. As embodied herein, a tubular guiding member 23 is provided within the interior of annular poppet 18, which member is axially and slidably supported by annular retainer 19 by an inner retainer portion 60. Retainer portion 60 includes an elongated cylindrical inner surface 62 extending in the direction of the axis of bore 17 for sliding contact with the outer cylindrical surface 23d of guiding member 23. The guiding member 23 is in contact at outer surface 23d with the inner annular surfaces of poppet member 18 to prevent the poppet valve member 18 from the radial movement thereof in the bore 17. Preferably, a front end 23a of tubular guiding member 23 abuts a backing plate 40 secured to the poppet member 18.

In accordance with the present invention, and as embodied herein, a coil spring 22 biases the poppet member 18 forward against valve seat 13a. Preferably, coil spring 22 is interposed between the spring retainer 20 and rear end 23b of the tubular guiding member 23. The biasing force of the spring 22 is smaller than the biasing force of the spring 21.

The power piston 105 is also provided with a rearwardly facing annular valve seat 24 for sealing abutment with the poppet valve member 18. Passages 25 and 26 are formed in the power piston 105. In FIG. 1 the rear chamber 107 is in fluid communication with the front chamber 106 through the passage 26, a clearance between the poppet member 18 and the valve seat 24, and the passage 25. The bore 17 is in normal communication with the atmosphere through air filters 27 disposed within a rear end portion of the bore 17 and openings 49a formed in the dust boots 49.

The plunger member 13 has a forwardly extending rod portion 13b which is slidably inserted into a bore 29a formed in an output rod 29 for operating a brake master cylinder not shown. Attached to a rear end of the output rod 29 is a reaction plate 30. Reaction levers 31 are disposed on the front side of the power piston 105. An inner end of each reaction lever 31 is interposed between the plunger member 13 and the reaction plate 30, while an outer end of each reaction lever 31 is interposed between the spring retainer 108 and the power piston 105.

In operation, there is shown the normal, non-braking or "rest" condition of the brake booster 100 in FIG. 1, wherein the brake pedal is released. The valve seat 13a of the plunger member 13 is in sealing abutment with sealing face 18a of the poppet member 18 which is spaced from the valve seat 24. Thus, the front and rear chambers 106 and 107 are in communication with each other through the passage 25, the clearance between the poppet member 18 and the valve seat 24, and the passage 26. Consequently, there is no pressure difference between the chambers 106 and 107.

When the brake pedal 60 is depressed, the push rod 15 is moved forward (to the left, in FIG. 1) to move the plunger member 13 forward. The guide member 23 and poppet member 18 are moved forward by the coil spring 22 in accordance with the movement of the plunger 13 and then the sealing face 18a of poppet member 18 seats on the valve seat 24, thereby interrupting communication between the chambers 106 and 107. Subsequently, the valve seat 13a of the plunger 13 becomes spaced from sealing face 18a of the poppet member 18, thereby admitting atmospheric air to the rear chamber 107 through the openings 49a, air filters 27, bore 17, the clearance between the valve seat 13a and face 18a of the poppet member 18, and passage 26. Thus, a pressure difference between the chambers 106 and 107 is generated to force the power piston 105 to move forwardly.

The force on the power piston 105 is transmitted to the output rod 29 through the reaction levers 31 and reaction plate 30. The reaction levers 31 exert the reaction force on the plunger member 13 to control the chambers 106 and 107 due to the operation of the control valve 50 of the present invention.

During the above-described operation, the push rod 15 tends to become slanted relative to the axis of the power piston 105 due to the pivotal mounting of the brake pedal to the vehicle body and the pivotal connection between the brake pedal and the push rod 15. In such instances, the coil spring 22 exerts radial as well as axial forces on the guide member 23 in accordance with the slant of the push rod 15. These radial forces can tend to cause the guide member 23 to move radially and/or become canted resulting in mis-seating of sealing face 18a on valve seat 13a. However, the tubular guide member 23 is supported and constrained by the retainer 19 so as to permit movement only in the axial direction so that radial movement of the poppet member 18 is prevented, thereby providing positive alignment between valve seat 13a and any depression that may have formed in the sealing face 18a and eliminating the failure of sealing abutment between the valve seat 13a of the plunger member 13 and the sealing face 18a of poppet member 18.

Referring to FIG. 2, there is shown a second embodiment of a control valve made in accordance with the present invention, like reference numbers designating like components in respect to the embodiment of FIG. 1 except as detailed hereinafter. In control valve 150 shown in FIG. 2, a coil spring 122 is interposed between the spring retainer 20 on the push rod 15 and the backing plate 40 of the poppet valve 18, without any intermediate force-transmitting member, such as guiding member 23 in FIG. 1. The retainer 119 is provided with an integral cylindrical axial guiding arm 119b an axially elongated outer cylindrical guiding surface 119c of which is in centering, sliding contact with an inner annular surface 18c of the poppet member 18 to prevent radial movement of the poppet member 18 in the bore 17.

Referring to FIG. 3, there is shown a third embodiment of a control valve made in accordance with the present invention like reference numbers depicting components described in relation to embodiment in FIGS. 1 and 2. As embodied herein and as shown in FIG. 3, control valve 250 has the backing plate 140 provided with integral axially extending guiding arm 140a which is in centering, sliding contact with the axially elongated inner cylindrical guiding surface 19d of the retainer 19 and prevents the radial movement of poppet member 18 in the bore 17.

Preferably, backing plate 140 is secured to poppet valve 18 and receives the biasing from spring 122 directly, and guiding arm 140a is cylindrical.

It will be apparent to those skilled in the art that various modifications and variations could be made in the control valves of the invention without departing from the scope and spirit thereof.

What is claimed is:

1. A control valve for controlling the pressure difference between opposite sides of a power piston in a brake booster, the valve comprising:
   a plunger member disposed within a central bore in the power piston and having a first valve seat formed in an axial end thereof;
   a push rod disposed within said bore and connected at one axial end to said plunger member and pivotally connected at the other axial end to a brake pedal; a second valve seat formed in a wall of said bore;
   an annular poppet member having an interior wall surface disposed within said bore and having a sealing face made of resilient material at one axial end thereof, said sealing face facing said first valve seat and said second valve seat;
   an annular retainer positioned within said bore, the other axial end of said poppet member being sealingly secured to the wall of said bore by said retainer, said poppet member having an intermediate flexible diaphragm portion;
   a coil spring for biasing said sealing face of said poppet member toward said valve seats, one end of said coil spring being connected to said push rod;
   guide means cooperating with the interior surface of said annular poppet member for centering said poppet member in said bore, said guide means including a tubular guiding member positioned within said poppet member, the outer cylindrical surface of said tubular guiding member contacting the inner surface of said annular poppet member; and
   wherein said annular retainer further includes an elongated inner cylindrical surface extending in the direction of the axis of said bore for contacting the outer cylindrical surface of said tubular guiding member, the axial length of said elongated guiding surface being a significant fraction of the overall axial length of said annular retainer, said tubular guiding member being supported and constrained for centered, sliding axial movement by said annular retainer elongated inner surface.

2. A control valve according to claim 1, wherein a backing plate is secured within said poppet member proximate said one axial end, and wherein said guiding member abuts said plate at one member end, said coil spring abutting said guiding member at the other member end.

3. A control valve according to claim 1, wherein said retainer has an integral guiding arm extending axially within said tubular poppet member, said elongated guiding surface being located on said guiding arm and contacting the inner surface of said annular poppet member and supporting said poppet member for centered, sliding axial movement.

4. A control valve according to claim 3, wherein said axially extending guiding arm is cylindrically shaped and the control valve further includes a backing plate secured within said poppet member proximate said one axial end, wherein the other end of said coil spring extends within said guiding arm and abuts said backing plate.

5. A control valve according to claim 1, wherein said guide means includes a backing plate secured within said poppet member proximate said one axial end, said backing plate having an integral axially extending guiding arm which is supported for centered, sliding axial movement by said elongated guiding surface of said retainer.

6. A control valve according to claim 5 wherein said guiding arm is cylindrically shaped and the other end of said coil spring extends within said guiding member and contacts said backing plate.

7. A control valve for controlling the pressure difference between opposite sides of a power piston in a brake booster, the valve comprising:
   a plunger member disposed within a central bore in the power piston and having a first valve seat formed in an axial end thereof;
   a push rod disposed within said bore and connected at one axial end to said plunger member and pivotally connected at the other axial end to a brake pedal; a second valve seat formed in a wall of said bore;
   an annular poppet member having an interior wall surface disposed within said bore and having a sealing face made of resilient material at one axial end thereof, said sealing face facing said first valve seat and said second valve seat;
   an annular retainer positioned within said bore, the other axial end of said poppet member being sealingly secured to the wall of said bore by said retainer, said poppet member having an intermediate flexible diaphragm portion;
   a coil spring for biasing said sealing face of said poppet member toward said valve seats, one end of said coil spring being connected to said push rod; and
   guide means cooperating with the interior surface of said annular poppet member for centering said poppet member in said bore, said guide means including a guiding surface of said annular retainer, said guiding surface being elongated in the direction of the axis of said bore, the axial length of said elongated guiding surface being a significant fraction of the overall axial length of said annular retainer.

* * * * *

UNITED STATES PATENT AND TRADEMARK OFFICE
CERTIFICATE OF CORRECTION

PATENT NO. : 4,368,661
DATED : January 18, 1983
INVENTOR(S) : ATSUSHI OHMI ET AL.

It is certified that error appears in the above—identified patent and that said Letters Patent is hereby corrected as shown below:

In claim 3, line 1, change "claim 1" to --claim 7--.

In claim 5, line 1, change "claim 1" to --claim 7--.

Signed and Sealed this

*First* Day of *November 1983*

[SEAL]

*Attest:*

*Attesting Officer*

GERALD J. MOSSINGHOFF
*Commissioner of Patents and Trademarks*